(12) United States Patent
Schlichter et al.

(10) Patent No.: US 11,607,630 B2
(45) Date of Patent: Mar. 21, 2023

(54) FILTER DEVICE

(71) Applicant: HYDAC PROCESS TECHNOLOGY GMBH, Neunkirchen (DE)

(72) Inventors: Bernhard Schlichter, Saarbruecken (DE); Joerg Hermann Gerstner, Puettlingen (DE); Manfred Deutschmeyer, Perl (DE)

(73) Assignee: HYDAC PROCESS TECHNOLOGY GMBH, Neunkirchen (DE)

( * ) Notice: Subject to any disclaimer, the term of this patent is extended or adjusted under 35 U.S.C. 154(b) by 923 days.

(21) Appl. No.: 16/339,765

(22) PCT Filed: Oct. 9, 2017

(86) PCT No.: PCT/EP2017/001191
§ 371 (c)(1),
(2) Date: Apr. 5, 2019

(87) PCT Pub. No.: WO2018/068887
PCT Pub. Date: Apr. 19, 2018

(65) Prior Publication Data
US 2020/0038787 A1    Feb. 6, 2020

(30) Foreign Application Priority Data

Oct. 12, 2016  (DE) .................... 10 2016 012 206.4
Mar. 1, 2017   (DE) .................... 10 2017 001 968.1
Mar. 1, 2017   (DE) .................... 10 2017 001 970.3

(51) Int. Cl.
*B01D 29/68*     (2006.01)
*B01D 29/23*     (2006.01)
(Continued)

(52) U.S. Cl.
CPC ........... *B01D 29/232* (2013.01); *B01D 29/23* (2013.01); *B01D 29/54* (2013.01); *B01D 29/58* (2013.01);
(Continued)

(58) Field of Classification Search
CPC .... B01D 29/232; B01D 29/54; B01D 29/682; B01D 29/688; B01D 29/23; B01D 29/58;
(Continued)

(56) References Cited

U.S. PATENT DOCUMENTS 2,066,479 A  *  1/1937  Macisaac ............... B01D 35/12
                                                    210/777
3,357,566 A      12/1967  Schmid et al.
(Continued)

FOREIGN PATENT DOCUMENTS

AT        004594 U1  *  9/2001
DE        84 36 010        4/1985
(Continued)

OTHER PUBLICATIONS

International Search Report (ISR) dated Jan. 29, 2018 in International (PCT) Application No. PCT/EP2017/0011911.

*Primary Examiner* — Thomas M Lithgow
(74) *Attorney, Agent, or Firm* — Wenderoth, Lind & Ponack, L.L.P.

(57) ABSTRACT

A filter device has a filter housing (1) with a fluid inlet (13) for raw fluid, with a fluid outlet (3) for filtrate and with at least one one-piece or multi-piece filter insert (5, 7) received in the filter housing (1). The filter insert can be cleaned using at least one back-flushing member (21) in counter-current to the filtration direction. This back-flushing member can, by a fluid-guiding driveshaft (23) of a rotary drive (35), be moved along the inner side (19) of the respective filter insert (5, 7) and has, at its end adjacent to this inner side (19), a
(Continued)

gap-shaped passage opening (39) that extends parallel to the axis of rotation of the driveshaft (23) and that discharges into a flow space (41; 57; 67) fluidically connected to the driveshaft (23). The flow space at least partially continuously narrows in the direction of the driveshaft (23) in a first plane in which the passage opening (39) lies. In another second plane transverse to the first plane, the flow space (41; 57; 67) at least partially continuously widens proceeding from the passage opening (39) in the direction of the driveshaft (23).

18 Claims, 9 Drawing Sheets

(51) Int. Cl.
*B01D 29/54* (2006.01)
*B01D 29/58* (2006.01)
*B01D 29/94* (2006.01)
*B01D 35/00* (2006.01)
*B01D 35/147* (2006.01)

(52) U.S. Cl.
CPC ......... *B01D 29/682* (2013.01); *B01D 29/688* (2013.01); *B01D 29/94* (2013.01); *B01D 35/005* (2013.01); *B01D 35/147* (2013.01); *B01D 2201/082* (2013.01)

(58) Field of Classification Search
CPC .... B01D 29/94; B01D 35/005; B01D 35/147; B01D 2201/082
USPC .......................................................... 210/411
See application file for complete search history.

(56) References Cited

U.S. PATENT DOCUMENTS

| | | | | |
|---|---|---|---|---|
| 5,587,074 A | * | 12/1996 | Lynch | B01D 29/23 210/411 |
| 7,297,265 B1 | * | 11/2007 | Booth | B01D 29/23 210/304 |

FOREIGN PATENT DOCUMENTS

| | | |
|---|---|---|
| DE | 34 43 752 | 6/1986 |
| DE | 36 11 075 | 10/1987 |
| DE | 9103 149 | 7/1992 |
| DE | 10 2007 014 573 | 9/2008 |
| DE | 20 2011 000 268 | 7/2012 |
| DE | 10 2011 086 670 | 5/2013 |
| DE | 20 2012 104 534 | 4/2014 |
| DE | 20 2016 003 089 | 7/2016 |
| WO | 00/78426 | 12/2000 |
| WO | WO 2015/189774 A1 * | 12/2015 |

\* cited by examiner

FILTER DEVICE

FIELD OF THE INVENTION

The invention concerns a filter device comprising a filter housing with a fluid inlet for unfiltrate and a fluid outlet for filtrate. At least one single-part or multi-part filter insert is accommodated inside the filter housing. The filter insert may be cleaned through a reverse flow with at least one backflush device. The backwash device is moveable by a fluid-conducting drive shaft of a rotary drive on the inside of the respective filter insert, and is provided with a slot-shaped flow passage at its end that is adjacent to the filter insert inside. The slot-shaped flow passage extends parallel to the rotational axis of the drive shaft and leads into a flow chamber that has a fluid connection with the drive shaft. The flow chamber tapers at least partially in the direction of the drive shaft in a first plane in which the flow passage is located.

BACKGROUND OF THE INVENTION

The operational reliability and life span of combustion engines is largely dependent on the high quality of the lubricating oil. In particular, the continuous operation of diesel engines, which in maritime applications, for example, are operated with heavy fuel oil, makes high demands on the quality of lubricating oil. In applications such as these, the use of filter devices to clean the lubricating oil is essential. In this respect, it is prior art to use filter devices in which the filter inserts can be backflushed to achieve longer operating periods between filter insert changes, and thus, reduce the maintenance costs. An example for the prior art, described in document DE 34 43 752 A1, is a filter device of the kind described above.

The cleaning efficiency in devices of this kind depends largely on the path taken by the backflush stream which, at the pressure difference that is available at the slot-shaped flow passage, passes through the flow chamber to the fluid-carrying, hollow, drive shaft.

The pressure difference present during the backflush operation at the slot of the flow passage, which is for example 1.5 bar with a system-generated backflush pressure and a drive shaft at ambient pressure, is designed to achieve a maximum entry velocity at the slot and a maximum backflush volume flow. To come closer to this goal, the described, known filter device provides for a reduction of the flushing cross-section, which is effective during the flushing process, in such a way that the backflush process is only applied to one of two backflush devices. To this end the known filter device is provided with a control facility, which controls the alternating operation of the backflush devices by splitting the sludge discharge over two flushing connections, each of which has a fluid connection with a backflush device. Such a splitting of the sludge discharge, which requires a valve device at each flushing connection, nullifies at least partly the advantages of the effective cleaning action. Moreover, this design runs the risk of blocking the sludge discharge through deposits, in particular in the valve devices at the flushing connections.

SUMMARY OF THE INVENTION

Based upon this prior art, an object of the invention is to provide a filter device of the kind described at the outset, which is characterized by a particularly effective cleaning action, whilst employing a simple design.

This object is basically met according to the invention by a filter device having, as a significant feature of the invention, in a further second plane extending transverse to the first plane in which the flow passage is located, the flow chamber widening out, continually at least in part, starting from the flow passage and in the direction of the drive shaft. Due to this expansion the flow chamber forms a kind of diffuser. This diffuser leads to a reduction in pressure loss, and thus, to the maximization of the backflush volume flow as well as the entry velocity at the slot of the flow passage. Due to the immediate proximity of the slot to the filter material, the cleaning action is particularly effective. The elimination of the valve devices, as provided by the described, known solution, ensures a particularly reliable operating behavior whilst simple in design.

Advantageously, the flow chamber in the first plane may be continuously tapered as a kind of inlet funnel.

In particularly advantageous exemplary arrangements, starting from the slot-shaped flow passage, formed in the first plane are at least
- one boundary wall of the inlet funnel extending obliquely and a further boundary wall extending level;
- two boundary walls extending obliquely and in a straight line;
- two boundary walls extending parabolically; and
- one boundary wall obliquely and in a straight line, and the further boundary wall curved.

In exemplary embodiments, in the direction of the flow linkage of the flow chamber to an internal fluid passage of the drive shaft, the respective flow chamber merges with its boundary walls into a tube-shaped or channel-shaped section in which the boundary walls extend in a straight line. A particularly homogenous velocity profile of the backflush volume flow then results.

Concerning the expansion of the flow chamber in the direction that extends transverse to the plane of the slot of the flow passage, the arrangement may advantageously be such that, in this second plane, the flow chamber expands from the slot-shaped flow passage in the direction of the internal fluid passage of the drive shaft in a conical manner with straight boundary walls.

In advantageous exemplary embodiments the flow chamber, at its exit from the backflush device in the direction of the respective filter insert, is provided with at least one fillet at the boundary walls of the slot-shaped flow passage, which extends parallel to the rotational axis of the drive shaft. The fillet forms a type of control surface along which deposited particles that accumulate during the rotational movement on the backflush device are guided along the fillet to the entry area of the flushing slot where, due to the high entry velocity, the maximum detaching force is present.

At an area ratio between slot inlet and channel exit, which is in the range from 0.2 to 2.0, preferably between 0.3 to 1.0, a homogenous velocity profile of the backflush volume flow results that facilitates the sludge outflow.

The expansion of the slot-shaped flow passage of height to its width is preferably in the range from 10 to 100, preferably in the range from 30 to 70.

Of particular advantage is where the ratio of the width of the slot-shaped flow passage to the free diameter of the tube-shaped or channel-shaped section, which forms the transition to the internal fluid passage of the drive shaft, is between 0.05 and 0.5.

In particularly advantageous exemplary embodiments, wing-shaped flow guide vanes are disposed inside the flow chamber, which guide vanes extend at least in part from the slot-shaped flow passage away in the direction of the channel exit.

Preferably, at least parts of the flow guide vanes extend in a curved or straight manner and extend fully between the boundary walls of the backflush device, which boundary walls extend parallel to the rotational axis of the drive shaft.

A particularly advantageous flow pattern may be achieved if at least one flow guide vane protrudes, starting from the slot-shaped flow passage, further into the flow chamber than at least one further flow guide vane. The further protruding flow guide vane, which is preferably disposed in the center of the slot-shaped opening of the flow passage, extends from the same in the direction of the inside of the flow chamber. In this instance the fluid advantageously passes inside the flow chamber from the slot inlet without diversion of the overall flow of the backflush volume up to before the channel exit.

Preferably, the respective backflush device, which faces the internal wall of the respective filter insert with its one free end face, is moved past the internal wall without a gap by the rotatable drive shaft.

In particularly advantageous exemplary embodiments, inserted backflush devices are exchangeably retained in an associated retainer housing, which is disposed on the drive shaft. Using the same design of drive shaft and associated rotational drive, the device may be adapted to the respective operating conditions in that in retainer housings on the drive shaft, the number of which depends on the number of filter inserts, a desired number of backflush devices are inserted. The quantity of which backflush devices, as well as the flow chamber geometry, may be chosen without restriction.

The arrangement may therefore be such that multiple backflush devices are inserted along the drive shaft, one above the other. The are disposed

- in at least two groups combined at different circumferential positions on the drive shaft, preferably diametrically opposed to each other with respect to the rotational axis of said drive shaft,
- in one group, exclusively on one side of the drive shaft, or
- in alternating succession on opposite sides of the drive shaft.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure:

FIGS. 19a-19d are graphical representations of examples for possible height distributions of inserted backflush devices according to an exemplary embodiment of the invention; and FIGS. 20a-20c are diagrammatic representations of three possible distributions of backflush devices over the circumference of respective filter inserts according to an exemplary embodiment of the invention.

DETAILED DESCRIPTION OF THE INVENTION

Figure 1:
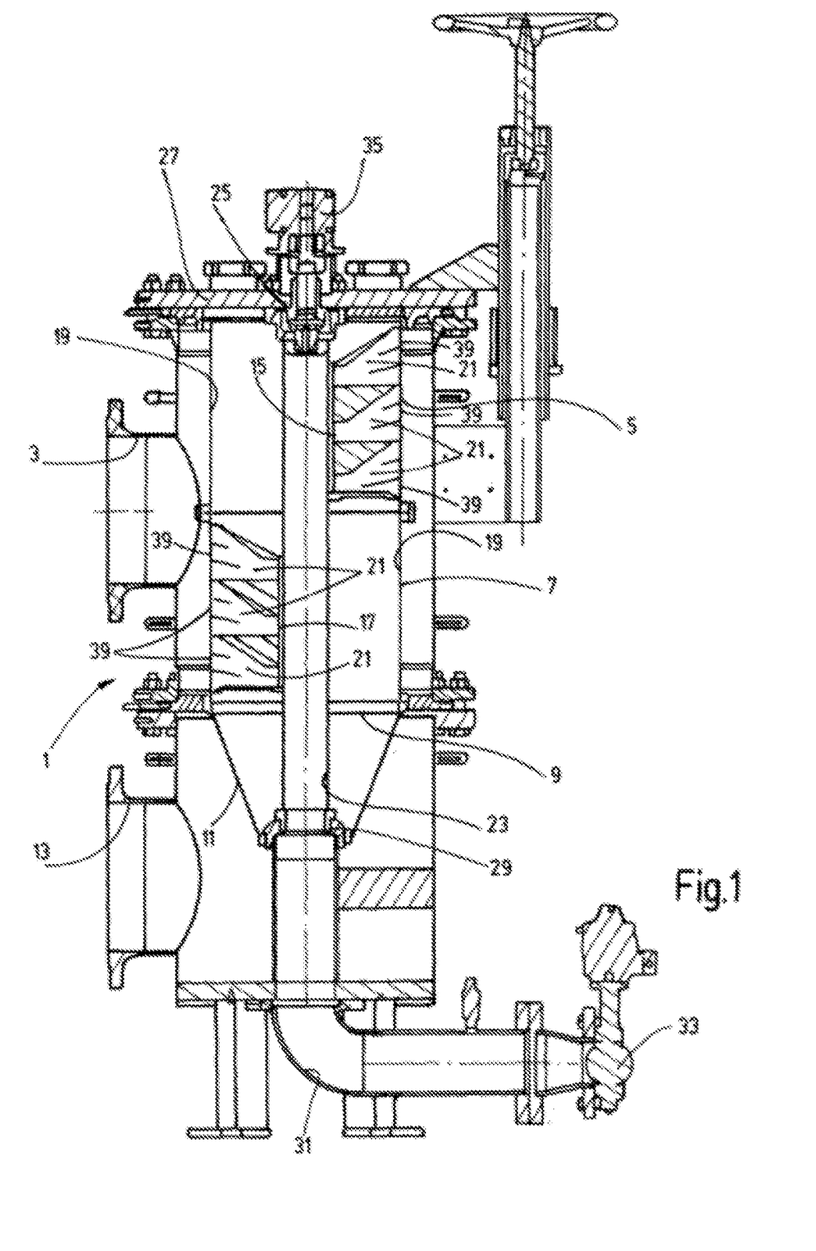
FIG. 1 is a schematically simplified, side view in section of a filter device according to a first exemplary embodiment of the invention.

In FIG. 1 depicts a first exemplary embodiment of the filter device according to the invention having a filter housing 1. Disposed on the side of the circular, cylinder-shaped filter housing 1 is a fluid outlet 3 for filtrate. Disposed inside the filter housing 1, one above the other, is an upper filter insert 5 and a lower filter insert 7, through which the flow passes from inside to outside during the filtration process. The unfiltrate may be supplied to both filter inserts 5 and 7 from a lower inlet side 9. A pre-filter is disposed as inlet filter 11 upstream of the inlet side 9, through which unfiltrate may be supplied from an unfiltrate inlet 13. When used in maritime applications the inlet filter 11 is provided as a fish strainer.

For the purpose of cleaning deposits off the filter material 19 from the upper filter insert 5 and the lower filter insert 7 during backflushing actions, a backflush arm 15 is provided for the upper filter insert 5 and a backflush arm 17 is provided for the lower filter insert 7. Each backwash arm is provided with three backflush devices or backflushers 21. In the exemplary embodiment shown, the backflush arms 15 and 17 are disposed, offset from each other by an axial distance and 180° radially or rotationally to each other, on a drive shaft 23. The upper end of drive shaft 23 is pivotally supported by a bearing 25 at the upper housing cover 27 of housing 1, as well as by a lower bearing 29. The open end of the drive shaft 23, which is formed by a tube, is at this point connected to a sludge discharge tube 31. Sludge discharge tube 31 is attached to which is a motor-actuated backflush valve 33, which closes the discharge tube 31 during filter operation and opens it for a backflush operation. To provide a rotational drive, the hollow drive shaft 23 is coupled at the upper bearing 25 to the gearbox 35 of an electric gear motor (not shown).

During filter operation the unfiltrate flows via the fluid inlet 13 through the inlet filter 11 and the inlet side 9 into the inner cavity of the filter inserts 5 and 7, flows through the filter material to the outside and is discharged via the filtrate outlet 3. During the backflush operation, which takes place with an open backflush valve 33, the rotating drive shaft 23 moves the backflush arms 15 and 17. As a result, the backflush devices 21 with their slot-shaped flow passages 39, which are located at their free end face 37, are moved past the inside of the filter material 19 of the filter inserts 5, 7 without a gap. On the backflush devices 21, the slot-shaped flow passages 39 form the inlet of their internal flow chamber, which is connected to the tube-shaped drive shaft 23. With the backflush valve 33 open, the slot-shaped flow passages 39 are subjected to the pressure differential between the system pressure on the filtrate side that surrounds the filter inserts 5, 7 and the pressure in the drive shaft 23, which may, for example, correspond to the ambient pressure. At this pressure differential, which is in the vicinity of 1.5 bar at the usual system pressure, particles deposited at the slotted nozzle-shaped flow passages 39 are detached and pass through the inner flow chamber of the backflush devices 21 into the drive shaft 23 and from there via the discharge tube 31 to the outside. Instead of the ambient pressure, it is possible to generate a negative pressure in the drive shaft 23 by means of a suction fan (not shown).

Figures 2, 3:
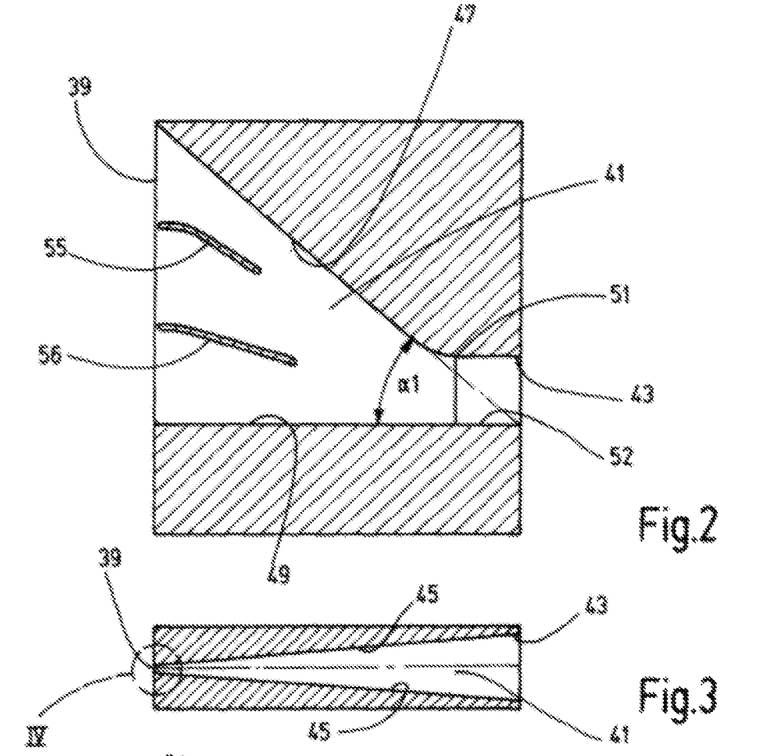
FIG. 2 is a vertical or side view in section of the flow chamber of an individual backflush device of the exemplary embodiment in FIG. 1.
FIG. 3 is a horizontal or plan view in section of the flow chamber of the backflush device in FIG. 2.

The FIGS. 2 and 3 depict the geometry of the inner flow chamber 41 of the backflush devices 21 provided in the exemplary embodiment of FIG. 1. Three backflush devices 21 each are attached to the backflush arms 15 and 17 vertically one above the other in such a way that their flow passages 39 adjoin each other and form a slot that extends over the entire height of the inside of the filter material 19.

Figure 4:
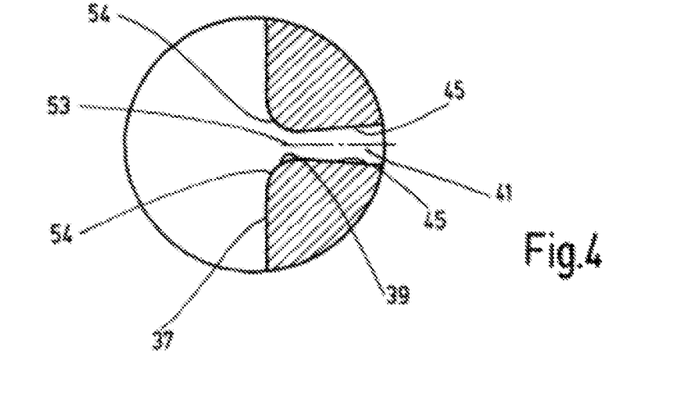
FIG. 4 is an enlarged plan view in section of the area designated IV in FIG. 3.

The FIGS. 2 to 4 depict the geometry of the flow chambers 41 of the backflush devices 21 provided in the example of FIG. 1. As is apparent from FIG. 3, in which the horizontal cross-section of the flow chamber 41 is shown in the plane that extends vertical in the drawing to the plane of the flow passage 39, the flow chamber 41 expands continuously from the inlet opening 39 towards the outlet 43 that is attached to the drive shaft 23. The side walls 45 of the flow chamber 41 diverge planar to each other. The path taken by the upper and lower boundary wall is apparent from FIG. 2. As depicted, the upper boundary wall 47 takes a straight, inclined path starting from the upper end of the flow passage 39 in the direction of the lower boundary wall 49, which extends along a level path in the horizontal plane that extends perpendicular relative to the direction of the flow passage 39. The upper and lower boundary wall 47 and 49 enclose the angle designated with a1 in FIG. 2, which in the present example is 38°. At a transition designated with 51 in FIG. 2, which is located at a distance from outlet 43, the upper boundary wall 47 changes from an inclined path to a parallel path relative to the lower boundary wall 49, so that an outlet tube 52 is formed between the transition 51 and the outlet 43. In the example shown, the distance between the transition 51 and the outlet 43 is approximately equal to the diameter of the outlet tube 52. The outlet tube 52 has, in the example shown, a diameter of 21 mm at a slot height of the flow passage 39 from 80 to 120 mm, and a slot width of 0.5 to 10 mm. The divergence of the side walls 45 is advantageously in the range from 4° to 8°. In the present example the angle is 5.3°. As shown in FIG. 4, the boundary walls 45 are provided with a fillet 54 at the entry point 53 of the slot-shaped flow passage 39. As depicted in FIG. 2, beginning at the flow passage 39, two wing-shaped flow guide vanes 55 and 56 are provided in the flow chamber 41, which extend between the side walls 45 towards the outlet 43. In this instance the flow guide vane 55, which is positioned out of center towards the top of the flow passage 39, extends over approximately one quarter of the length of the flow chamber 41, measured in radial direction. The lower flow guide vane 56, which starts somewhat below the center of the height of the flow passage 39, is of a reduced length.

Figure 5:
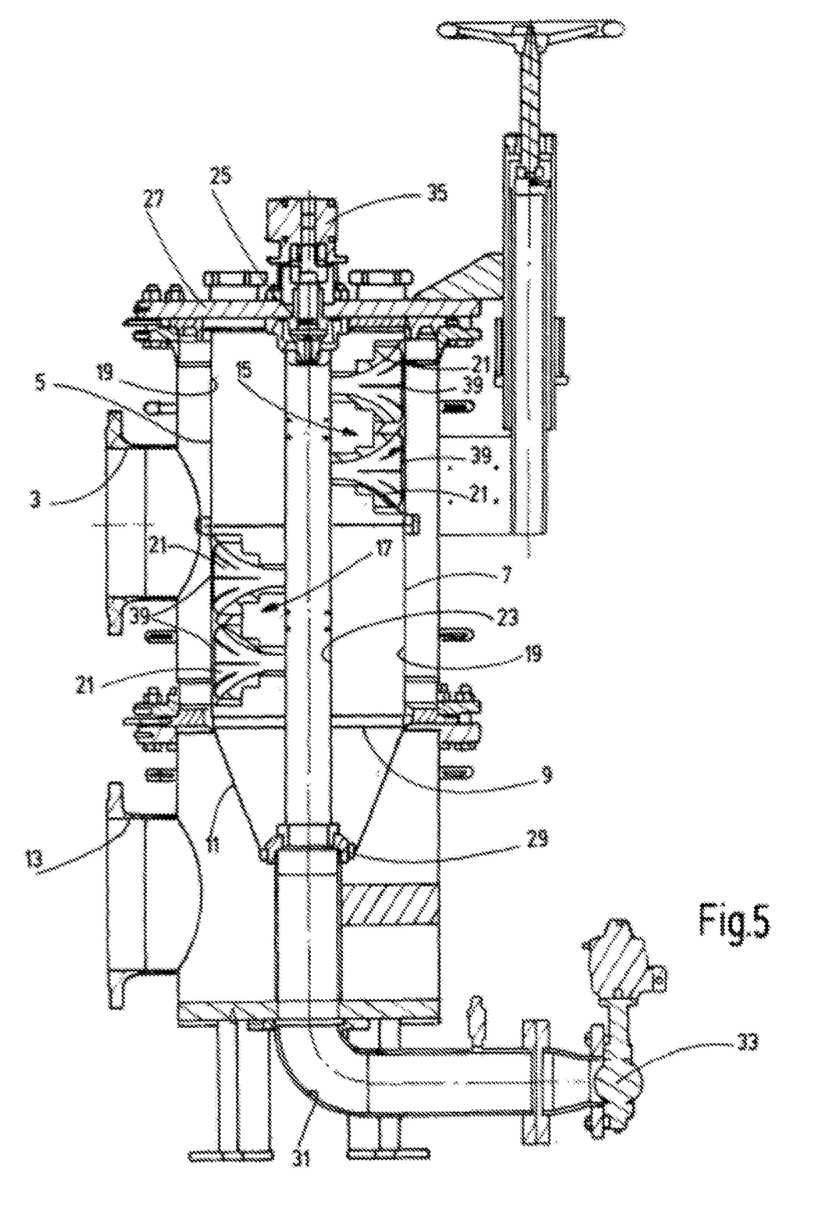
FIG. 5 is a schematically simplified, side view in section of a filter device according to a second exemplary embodiment of the invention.
Figure 6:
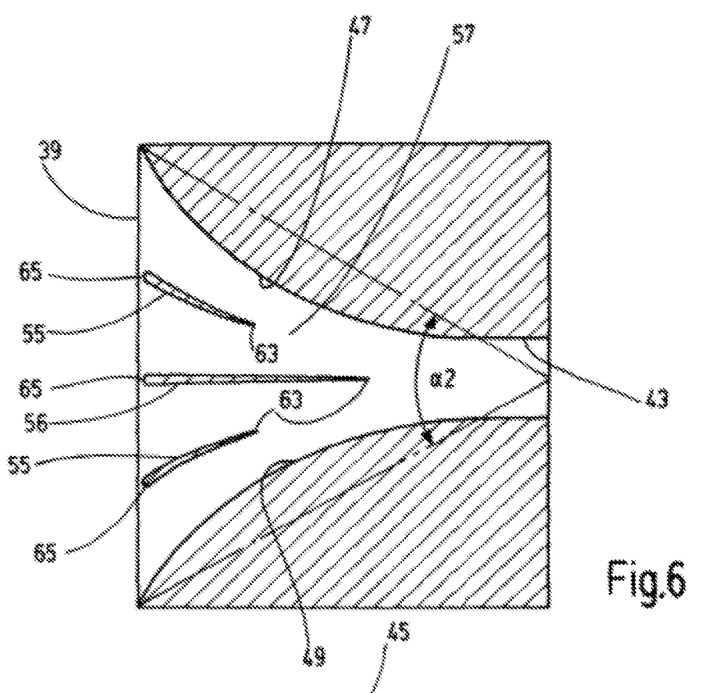
FIG. 6 is a vertical or side view in section of the flow chamber of an individual backflush device of the exemplary embodiment in FIG. 5.
Figure 7:
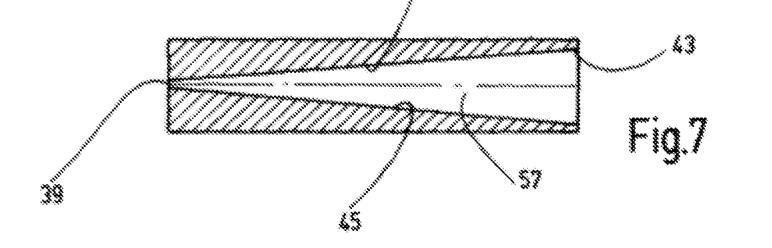
FIG. 7 is a horizontal or plan view in section of the flow chamber in FIG. 6.
Figure 8:
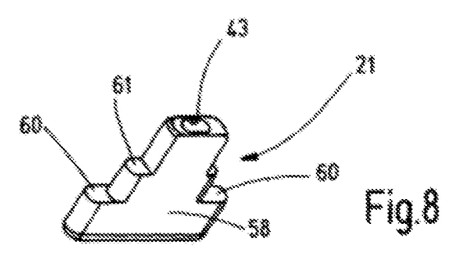
FIG. 8 is a perspective view, drawn smaller compared to a practical embodiment, of an individual backflush device of the exemplary embodiment in FIG. 5.
Figures 9, 11, 12:
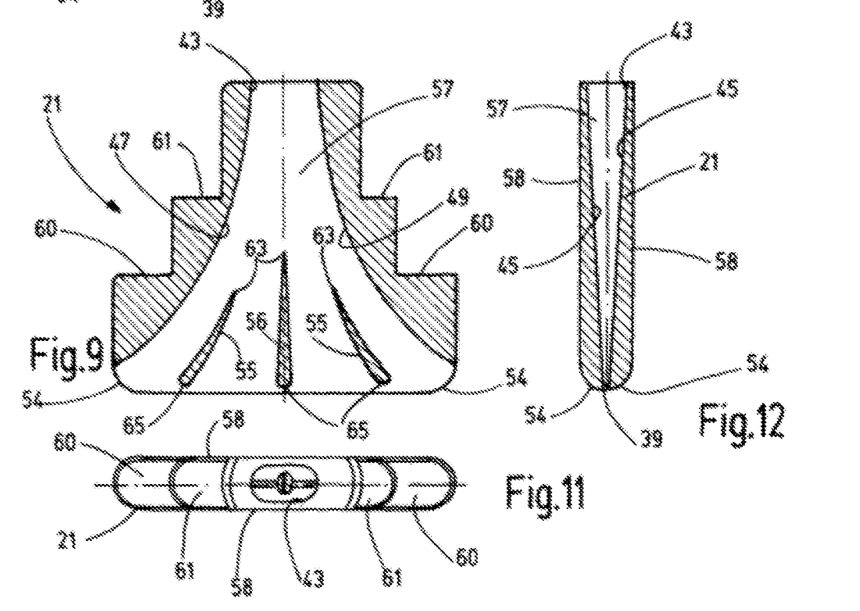
FIG. 9 is a vertical or side view in of the backflush device in FIG. 8, shown in approximately natural size.
FIGS. 10 and 11 are a front view and a rear view, respectively, of the backflush device of FIGS. 8 and 9.
FIG. 12 is a horizontal or plan view in section of this backflush device of FIGS. 8 and 9.
Figure 10:
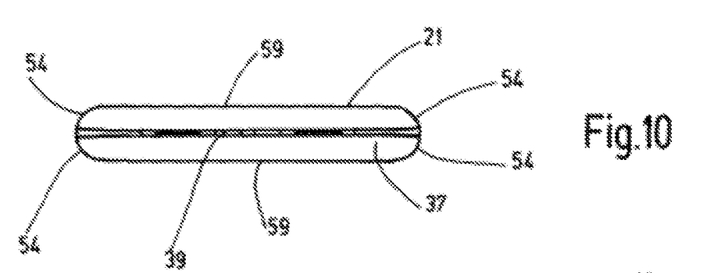

FIG. 5 depicts a second exemplary embodiment of the filter device according to the invention. This second embodiment corresponds with the first exemplary embodiment, except that disposed on the drive shaft 23 for each filter insert 5 and 7 are two backflush devices 21, located one above the other, the flow chambers 57 of which have a different shape compared to the flow chambers 41 of the first example. The backflush devices 21 of the example in FIG. 5 and the geometry of their flow chambers 57 are shown in greater detail in FIGS. 6 to 11. As shown in FIGS. 8 and 9, the backflush devices 21 of this example come in form of a body with two flat lateral outer surfaces 58, which extend from both planes to the outlet 43 at the long sides 59 of the free end face 37. Those planes are parallel to the slot-shaped flow passage 39. The width of the lateral surfaces 58 reduces towards the outlet 43 in two steps 60 and 61. Whilst in the first example the upper boundary wall 47 and the lower boundary wall 49 of the inlet funnel extend in a straight line from the flow passage 39 to outlet 43, in the second example both boundary walls 47 and 49 extend along the same parabolic curve (see in particular FIG. 6). As indicated there, this path causes a widening of the inflow funnel that corresponds to an opening angle of α2, which in the current example is 63°. The ratio of slot height to slot width of the flow passage 39 is 61 in this exemplary embodiment. As in the first example, the side walls 45 diverge from the flow passage 39 to the outlet 43 at an angle that is 6° in the example shown. As in the first exemplary embodiment, the area ratio of the slot entry of the flow passage 39 and the channel exit at the outlet 43 is in the range between 0.2 and 2.0, and is in the present example 0.7. Also corresponding to the first exemplary embodiment, the ratio of the width of the slot-shaped flow passage 39 to the free diameter of the tube-shaped or channel-shaped section at outlet 43, that is, at the transition to the internal fluid conductance of drive shaft 23, is in the range from 0.05 to 0.5, and is in the depicted example 0.1.

A further difference compared to the first exemplary embodiment lies in the fact that three flow guide vanes 55, 56 are disposed inside the flow chamber 57. Of those, the first flow guide vane 56, which is situated centrally on the symmetrical axis between the boundary walls 47 and 49, is longer than the two further flow guide vanes 55, which are disposed in the area between the central flow guide vane 56 and the upper boundary wall 47 and in the area between the lower boundary wall 49 and the central flow guide vane 56. The shorter flow guide vanes 55, which both have the same shape and which extend with their concave curvature facing the adjacent boundary wall 47, 49, are arranged such that the flow chamber 57 takes on a symmetrical cross-sectional shape. The tapered, inner ends 63 of the flow guide vanes 55 are at a lesser distance from the respective adjacent boundary wall 47 and 49 than the rounded noses 65, which in turn have the same distance from the rounded nose 65 of the central guide vane 56 at the flow passage 39 (see FIG. 6).

Figure 13:
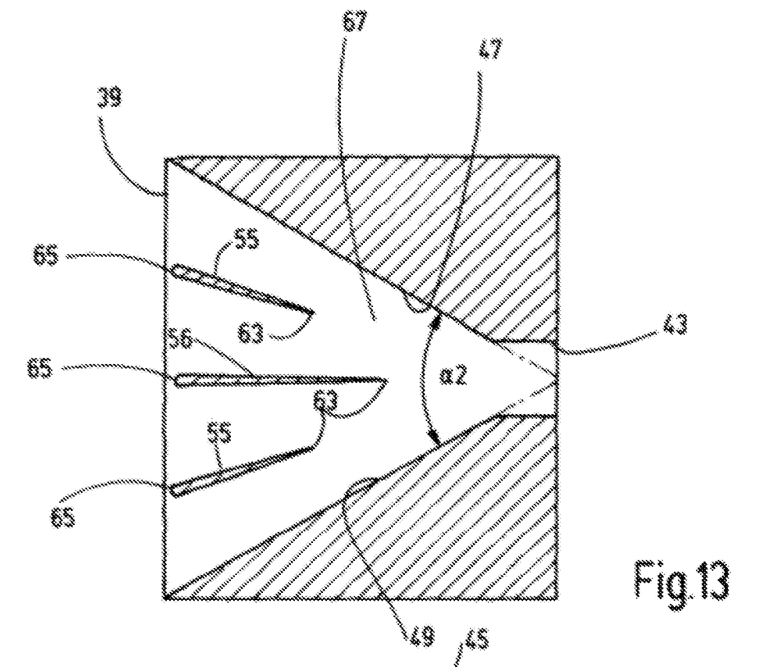
FIGS. 13 and 14 are a vertical and horizontal views in section, respectively, of the flow chamber of an individual backflush device according to a third exemplary embodiment of the invention.
Figure 14:
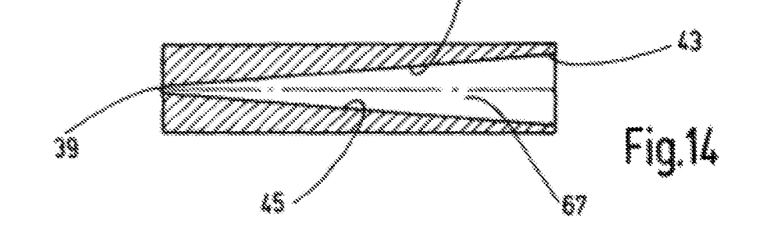

For the backflush devices 21 for the exemplary embodiment in FIG. 5, the FIGS. 13 and 14 show a flow chamber 67 with a slightly modified geometry. In contrast to the above-described example, the upper boundary wall 47 and the lower boundary wall 49 are not parabolic, but extend in a straight line. In symmetrical adaptation to this, the shorter flow guides 55 are not curved but straight, although the positioning is the same as in the above-described example. The angle and area ratios also correspond to those of the above-described example.

Figure 15:
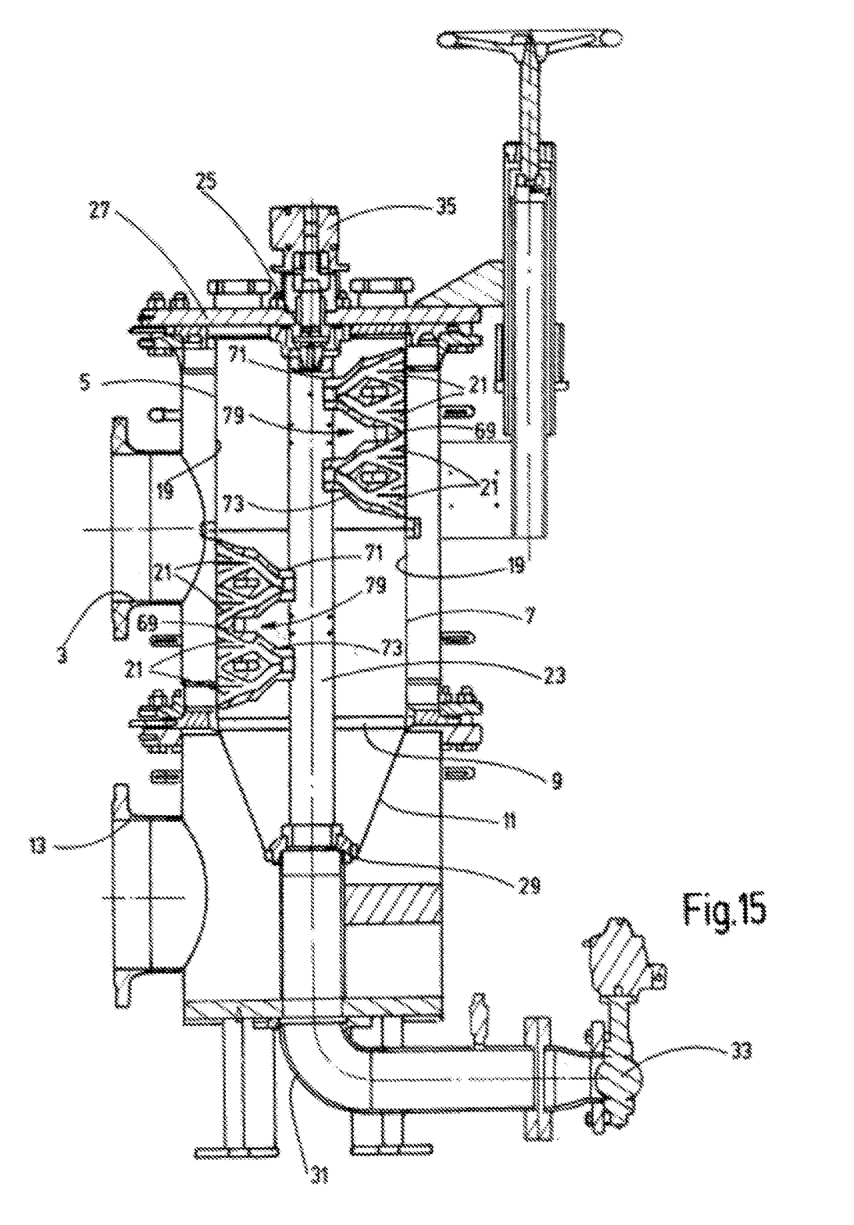
FIG. 15 is a schematically simplified, vertical or side view in section of a filter device according to a fourth exemplary embodiment of the invention.
Figure 16:
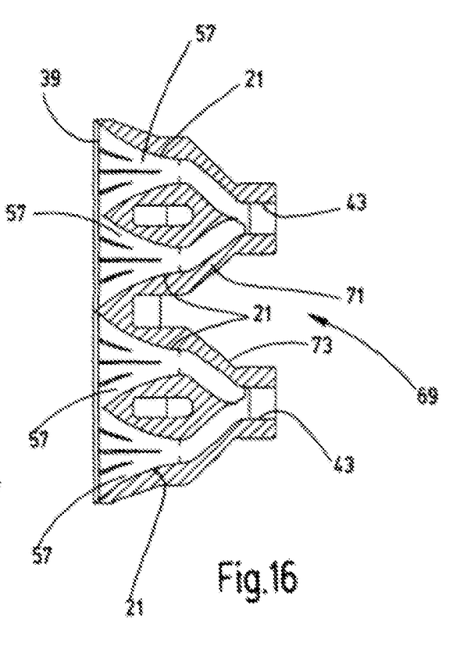
FIG. 16 is a vertical or side view in section of the backflush device used for a filter insert in the exemplary embodiment of FIG. 15.

The FIG. 15 depicts a further exemplary embodiment of the filter device according to the invention. Four backflush devices 21, one above the other, are provided for each filter insert 5 and 7, which essentially correspond to the backflush devices 21 of FIGS. 8 to 11, that is, they correspond to the flow chamber 57 with parabolic boundary walls 47, 49 and with three flow guide vanes 55, 56 depicted there. However, in the example of FIG. 15, the backflush devices 21 are part of a common retainer housing 69 which, as shown more clearly in FIG. 16, includes an upper housing half 71 and a lower housing half 73.

Figure 17:
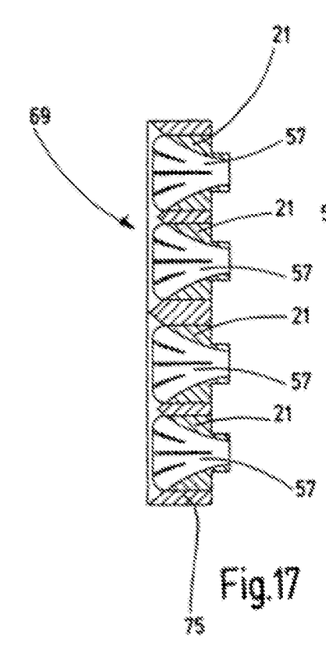
FIG. 17 is a vertical or side view in section of a modified version compared to the exemplary embodiment of FIGS. 15 and 16, showing the backflush devices formed by inserts, and inserted into a retainer housing.
Figure 18:
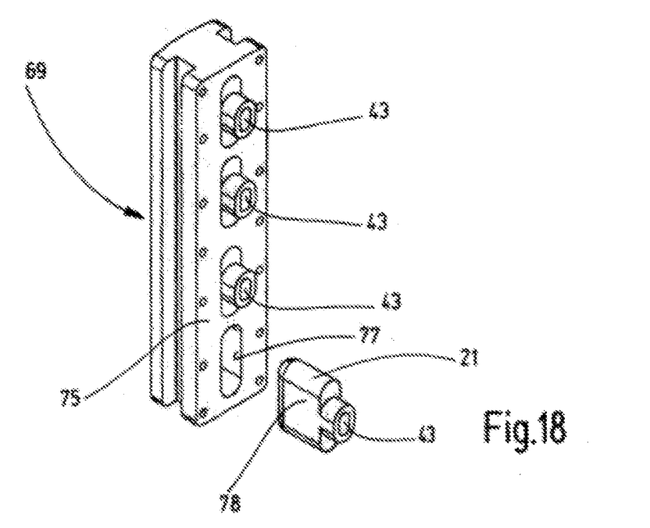
FIG. 18 is a perspective view of a retainer housing for four backflush devices, formed by an insert each, depicting an insert prior to insertion.

Each housing half 71, 73 forms the outlet 43 for two backflush devices 21. FIGS. 17 and 18 show a variation of this exemplary embodiment in which the retainer housing 69 takes the shape of a rail member 75 that may be attached to the outside of the drive shaft 23, which is preferably formed by a square tube. The rail member 75 may be attached and in which insertion slots 77 are formed, into which the backflush devices 21 may be inserted in form of exchangeable inserts 78 (see FIG. 8), which depicts a backflush device 21 prior to insertion. The external shape of the backflush devices 21 as inserts 78 correspond, as shown in FIG. 18, essentially to the external shape of the backflush device 21 shown in FIGS. 8 to 11 apart from the fact that the narrow sides are stepped only once. Whilst in the example of FIGS. 17 and 18 the flow chambers have the same geometry as the flow chamber 57 (see FIG. 3), backflush devices 21 with differently-shaped flow chambers 41 or 67 may be installed as inserts 78 into the insertion slots 77 of the retainer housing 49.

Figure 19A:
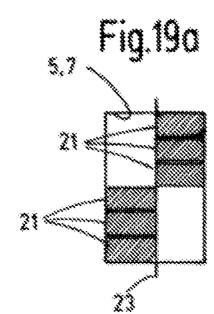
Figure 19B:
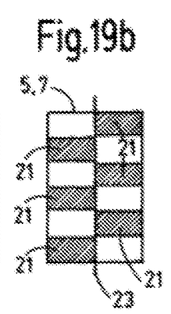
Figure 19C:
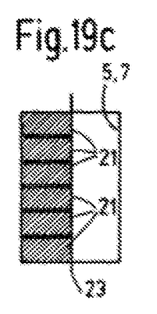
Figure 19D:
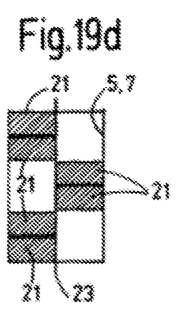
Figure 20A:
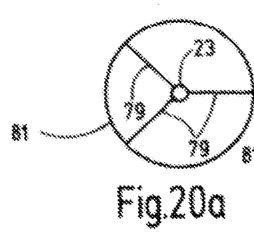
Figures 20B, 20C:
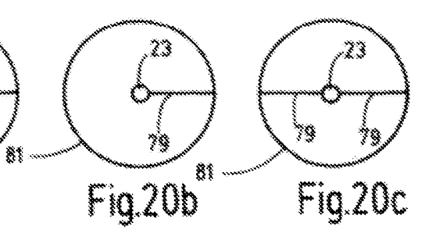

Since in FIGS. 1, 5 and 15 only one backflush arm 15 and 17, respectively, are provided each on the drive shaft 23 for each filter insert 5 and 7, different arrangements are possible. The FIGS. 19a to 19d depict examples of possible configurations. As shown in FIGS. 19a, 19b and 19d, for each filter insert 5 or 7 more than one backflush arm is provided, of which, in the example of FIG. 19a, each is provided with three backflush devices 21 in an arrangement adjacent to one another. FIG. 19b also shows two backflush arms for each filter insert 5, 7, wherein each backflush arm is provided with three backflush devices 21 that are arranged at a distance from each other, and wherein the backflush devices 21 of the one backflush arm are directed into the gaps between the backflush devices 21 of the other backflush arm. As shown in FIG. 19c, only one backflush arm is provided for each filter insert 5, 7, in which six backflush devices 21 are provided adjacent to one another. The FIG. 19d on the other hand shows for each filter insert 5, 7 two backflush arms, of which the one shown on the right hand side of the figure is provided with two backflush devices 21, which are located at a height of a gap between two upper backflush devices 21 and two lower backflush devices 21 of the other backflush arm. The FIGS. 20a to 20c depict examples of possible distributions of backflush arms 79 inside their turning circle 81.

Besides filtration of lubrication oil, the filter device according to the invention may also be used for other applications for which it is suitable. Apart from the already mentioned maritime application in which ballast water in ships is cleaned, the device may also be used to treat process water.

While various embodiments have been chosen to illustrate the invention, it will be understood by those skilled in the art that various changes and modifications can be made therein without departing from the scope of the invention as defined in the claims.

The invention claimed is:

1. A filter device, comprising:
a filter housing having a fluid inlet for unfiltrate and a fluid outlet for filtrate;
a filter insert being inside the filter housing and being cleanable through a reverse flow;
a backflusher being capable of cleaning the filter insert by generating the reverse flow and being rotatable about a rotational axis by a fluid-conducting drive shaft of a rotary drive on an inside of filter material of the filter insert, the backflusher having a slot-shaped flow passage at an end of the backflusher adjacent to the inside of the filter material, the slot-shaped flow passage extending parallel to the rotational axis leading into a flow chamber connected in fluid communication with the drive shaft, the flow chamber tapering at least partially in a direction of the drive shaft in a first plane in which the flow passage is located and widening out continually at least partially starting from the flow passage in the direction of the drive shaft in a second plane extending transverse to the first plane; and
wing-shaped first and second guide vanes being disposed in the flow chamber and extending at least in part away from the flow passage in a direction of a channel exit of the flow chamber, the first guide vane protruding from the flow passage further into the flow chamber than the second guide vane.

2. A filter device according to claim 1 wherein
a wing-shaped third guide vane is disposed in the flow chamber and extends at least in part way from the flow chamber and extends at least in part away from the flow passage in the direction of the channel exit of the flow chamber and to a same extend as the second guide vane, the first guide vane being between the second and third guide vanes.

3. A filter device according to claim 1 wherein
the first guide vane is disposed in a center of the flow passage.

4. A filter device according to claim 1 wherein
the first and second guide vanes converge toward one another.

5. A filter device according to claim 2 wherein
the second and third guide vanes converge toward the first guide vane.

6. A filter device according to claim 1 wherein
the flow chamber is continuously tapered in the first plane from the flow passage to the drive shaft.

7. A filter device according to claim 1 wherein
the flow chamber comprises a first boundary wall extending obliquely relative to a longitudinal axis of the flow chamber, a second boundary wall extending parallel to the longitudinal axis.

8. A filter device according to claim 1 wherein the flow chamber comprises first and second boundary walls extending obliquely relative to a longitudinal axis of the flow chamber and extending in straight lines.

9. A filter device according to claim 1 wherein the flow chamber comprises first and second boundary walls extending parabolically.

10. A filter device according to claim 1 wherein the flow chamber comprises a first boundary wall extending obliquely relative to a longitudinal axis of the flow chamber and extending in a straight line, and a second boundary wall being curved.

11. A filter device according to claim 1 wherein the flow chamber comprises first and second boundary walls extending from the flow passage toward the drive shaft and merging into a tube-shaped section with boundary walls extending parallel to a longitudinal axis of the flow chamber along straight lines and open into an internal passage of the drive shaft.

12. A filter device according to claim 1 wherein the flow chamber expands from the flow passage toward an internal passage of the drive shaft conically with straight boundary walls in the second plane.

13. A filter device according to claim 1 wherein the first and second guide vanes are curved or straight and extend fully between boundary walls of the flow chamber extending parallel to the rotational axis.

14. A filter device according to claim 1 wherein each of the first and second guide vanes is tapered in the direction of the drive shaft.

15. A filter device, comprising:
a filter housing having a fluid inlet for unfiltrate and a fluid outlet for filtrate;
a filter insert being inside the filter housing and being cleanable through a reverse flow;
a backflusher being capable of cleaning the filter insert by generating the reverse flow and being rotatable about a rotational axis by a fluid-conducting drive shaft of a rotary drive on an inside of filter material of the filter insert, the backflusher having a slot-shaped flow passage at an end of the backflusher adjacent to the inside of the filter material, the slot-shaped flow passage extending parallel to the rotational axis leading into a flow chamber connected in fluid communication with the drive shaft, the flow chamber tapering at least partially in a direction of the drive shaft in a first plane in which the flow passage is located and widening out continually at least partially starting from the flow passage in the direction of the drive shaft in a second plane extending transverse to the first plane; and
wing-shaped first and second guide vanes being disposed in the flow chamber and extending at least in part away from the flow passage in a direction of a channel exit of the flow chamber, the first and second guide vanes converging toward one another.

16. A filter device according to claim 15 wherein a wing-shaped third guide vane is disposed in the flow chamber and extends at least in part way from the flow chamber and extends at least in part away from the flow passage in the direction of the channel exit of the flow chamber and to a same extend as the second guide vane, the first guide vane being between the second and third guide vanes.

17. A filter device according to claim 16 wherein the first guide vane is disposed between the second and third guide vanes converging toward the first guide vane.

18. A filter device according to claim 15 wherein each of the first and second guide vanes is tapered in the direction of the drive shaft.

* * * * *